US006764176B1

(12) United States Patent
Carlson et al.

(10) Patent No.: US 6,764,176 B1
(45) Date of Patent: Jul. 20, 2004

(54) EYEWEAR MAGNIFYING LOUPE

(75) Inventors: Paul Eric Carlson, Skaneateles, NY (US); Richard J. Stryker, Scottsville, NY (US); Marvel M. Bieber, Kendall, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 10/393,634

(22) Filed: Mar. 20, 2003

(51) Int. Cl.[7] .............................................. G02C 9/02
(52) U.S. Cl. ......................... 351/59; 351/57; 351/116
(58) Field of Search ..................... 351/47, 48, 57–59, 351/116, 158

(56) References Cited

U.S. PATENT DOCUMENTS

| | | | | |
|---|---|---|---|---|
| 1,395,625 A | * | 11/1921 | Zimmerman | 351/158 |
| 2,578,589 A | * | 12/1951 | Pawelski | 359/802 |
| 2,796,803 A | | 6/1957 | Stegeman | 88/41 |
| 3,436,761 A | * | 4/1969 | Liautaud et al. | 2/13 |
| 4,196,966 A | | 4/1980 | Malis | 350/145 |
| 4,349,246 A | | 9/1982 | Binner | 350/298 |
| 4,429,959 A | | 2/1984 | Walters | 351/158 |
| D286,395 S | | 10/1986 | Greenlaw et al. | D12/189 |
| 4,647,165 A | | 3/1987 | Lewis | 351/59 |
| 4,676,609 A | | 6/1987 | Matsui | 351/118 |
| 4,733,958 A | | 3/1988 | Gorsich | 351/158 |
| 4,798,454 A | | 1/1989 | Hyun | 351/50 |
| 4,896,956 A | | 1/1990 | Berke | 351/50 |
| 4,934,806 A | | 6/1990 | Berke | 351/50 |
| 5,005,964 A | | 4/1991 | Berke | 351/50 |
| 5,048,943 A | | 9/1991 | Allen | 351/50 |
| D327,079 S | | 6/1992 | Allen | D16/102 |
| 5,381,263 A | | 1/1995 | Nowak | 359/411 |
| 5,446,507 A | | 8/1995 | Chang | 351/158 |
| 5,521,654 A | | 5/1996 | Bertieri | 351/46 |
| 5,667,291 A | | 9/1997 | Caplan et al. | 362/105 |
| 5,923,396 A | | 7/1999 | Ulvio | 351/57 |
| 6,254,233 B1 | * | 7/2001 | Prestandrea et al. | 351/57 |
| 6,356,400 B1 | | 3/2002 | Goff | 359/802 |

* cited by examiner

*Primary Examiner*—Huy Mai
(74) *Attorney, Agent, or Firm*—Katherine McGuire

(57) ABSTRACT

An eyewear loupe having one or more magnifying lenses for removable attachment to an eyewear includes up to three eyewear-engaging spaces allowing attachment to a variety of different sized eyewear. An adapter for attaching to the shield of shield-type eyewear is provided allowing the loupe to be attached to safety glasses, for example.

9 Claims, 5 Drawing Sheets

EYEWEAR MAGNIFYING LOUPE

BACKGROUND OF THE INVENTION

The present invention relates to eyewear loupes for removable attachment to an eyewear which allows the user to selectively magnify images seen through the eyewear by pivoting the magnifying lens into the user's field of vision.

Eyewear loupes for removable attachment to an eyewear frame have been known for a very long time. Eyewear loupes are useful for magnifying images using magnifying lenses which are carried by the loupe. In typical operation, the loupe is removably attached to the frame of the eyewear, with one or more magnifying lenses being pivotally movable about the loupe. As such, the user may selectively pivot the magnifying lens or lenses into and out of the user's field of vision. The eyewear itself may be either prescriptive or piano such as safety glasses, for example. A problem with prior art loupes is the inability to attach the loupe to a wide variety of eyewear sizes and types. One prior art reference U.S. Pat. No. 2,796,803 teaches a clamping mechanism which can attach to two different sized temples, however, this limits the loupes' adaptability in that it is thus limited to being able to fit only a relatively large or a relatively small temple size. The present invention provides an improved eyewear loupe as described below.

SUMMARY OF THE INVENTION

The present invention solves the above stated problem of prior art loupes by providing an eyewear loupe having an attachment assembly which is adapted to removably attach to an even wider variety of eyewear types. In particular, the loupe of the present invention includes a clamping mechanism which allows quick and easy removable attachment to an eyewear temple or adapter, whether the temple is of a large, medium or small cross-section. In one particularly useful embodiment, a shield adapter is provided which is attached to the shield of a shield-type eyewear (e.g., safety glasses) to which the clamping mechanism of the eyewear loupe removably attaches.

DETAILED DESCRIPTION

Figure 1:
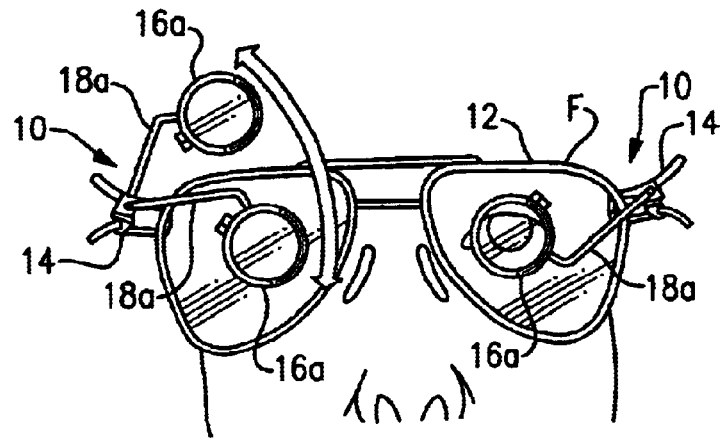
FIG. 1 is a front elevational view showing an embodiment of the eyewear loupe attached to an eyewear as worn by a person.
Figure 2:
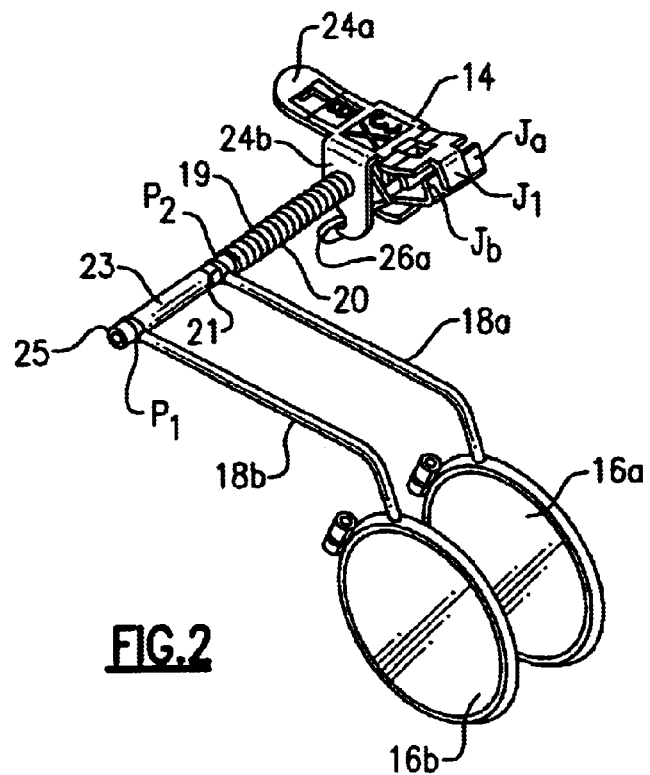
FIG. 2 is a perspective view of a two-lens embodiment of the eyewear loupe.

Referring now to the drawing, there is seen in FIGS. 1 and 2 the inventive eyewear loupe designated generally by the reference numeral 10 shown attached to each temple of an eyewear 12. In practice, a single eyewear loupe 10 may be attached to either temple of the eyewear or two loupes 10 may be attached to a respective temple, as desired. Loupe 10 basically comprises a clamping mechanism 14 for removably attaching the loupe 10 to an eyewear, and one or more magnifying lenses 16a,16b which are carried by a respective arm 18a,18b, each of which are pivotally connected to the clamping mechanism 14 via an extension rod 20 (see also FIG. 4). As such, the magnifying lens 16a and/or 16b may be pivoted into and out of the wearer's field of vision as indicated by the arrow in FIG. 1.

FIG. 2 shows a two-lens embodiment of loupe 10 having two magnifying lenses 16a,16b pivotally connected about pivot points $P_1,P_2$, respectively, to clamping mechanism 14. It is seen that lenses 16a,16b may be moved into alignment such that the magnification power of the combined lenses may be used, if desired. Alternatively, the single lens 16a may positioned in the wearer's field of view with the lens 16b pivoted out of the wearer's filed of view, and vice versa. Thus, although lenses 16a and 16b are discussed herein for purposes of description, it is understood that one or more than one magnifying lenses, each of the same or a different magnifying power, may be mounted in series on loupe 10, as desired.

Figure 3A:
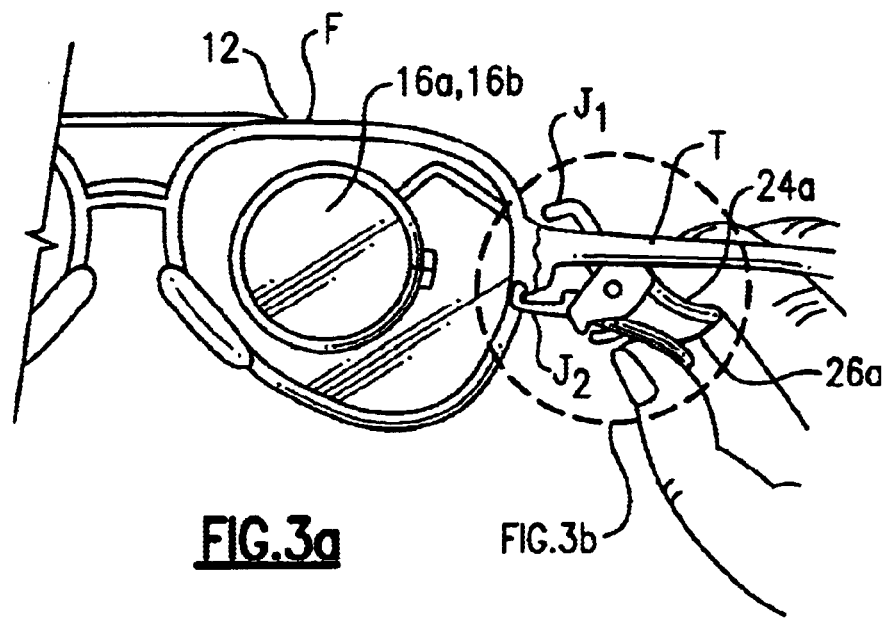
FIG. 3a is a rear view of a fragmented eyewear frame showing the manner of attaching the eyewear loupe to the eyewear temple.
Figure 3B:
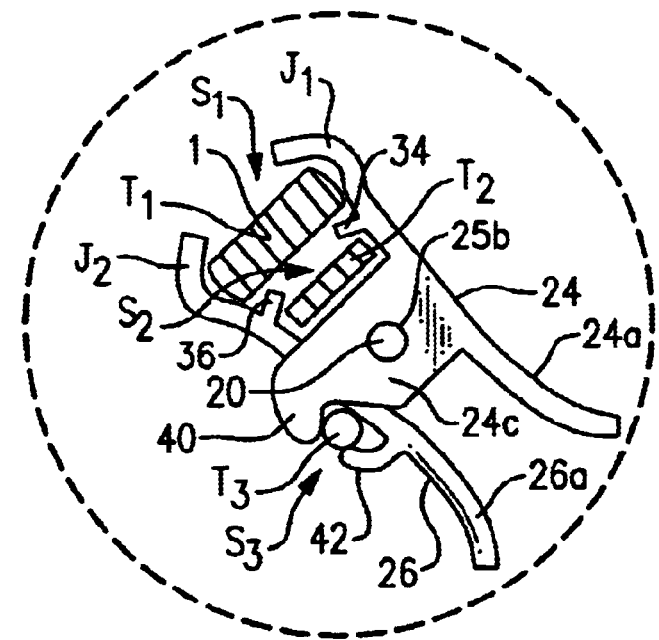
FIG. 3b is an enlarged view of the clamping mechanism of the loupe as seen in FIG. 3a and showing temples of large, medium and small cross-section to which the loupe may removably attach.
Figure 4:
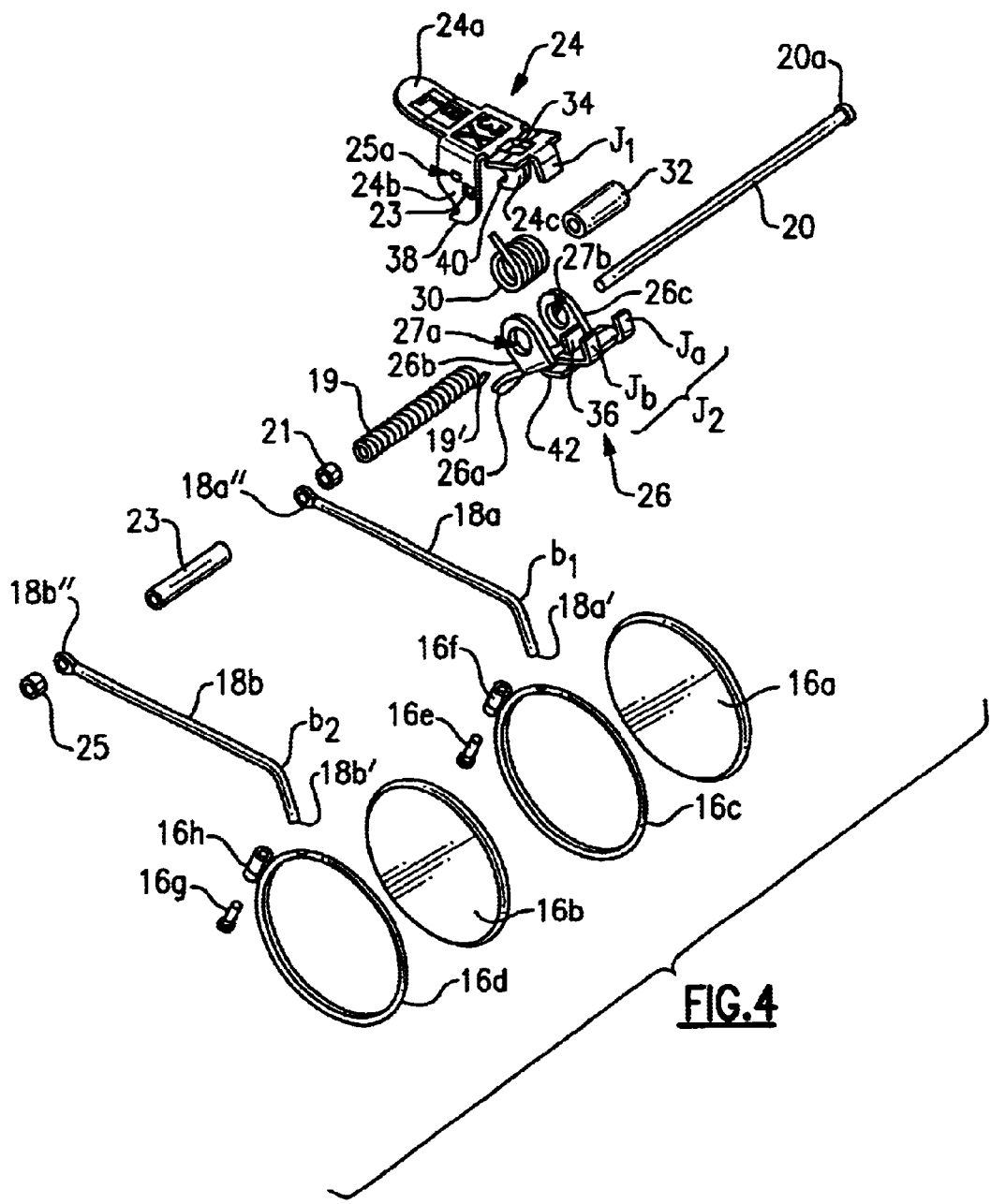
FIG. 4 is an exploded view of the two-lens embodiment of the eyewear loupe.

Referring now to FIGS. 3a, 3b and 4, a preferred embodiment of the clamping mechanism 14 is seen to comprise first and second gripping members 24,26 which are pivotally connected to each other and spring-biased in the clamped (closed) position. More particularly, gripping member 24 includes a pair of spaced pivot brackets 24b,24c having aligned through-holes 25a,25b formed therein, respectively. Likewise, gripping member 26 includes a pair of spaced pivot brackets 26b,26c having aligned through-holes 27a, 27b formed therein. The spacing of pivot brackets 24b,24c on gripping member 24 is slightly wider than the spacing of pivot brackets 26b,26c of gripping member 26. As such, pivot brackets 26b,26c are located closely adjacent to and inwardly of pivot brackets 24b,24c, respectively, in the assembled condition of the clamping mechanism 14. Prior to insertion of rod 20 through the gripping members, clamp spring 30 is positioned between arms 26b,26c with a cylindrical bushing 32 inserted longitudinally through spring 30. With the through-holes 25a,25b of gripping member 24 in axial alignment with through-holes 27a,27b of gripping member 26, and also aligned with spring 30 and bushing 32, rod 20 is extended therethrough until the head of end 20a of rod 20 abuts against through-hole 25b (see FIG. 3b). Since the diameter of rod end 20a is slightly larger than through-hole 25b, rod end 25a will stop advancing once it presses against pivot bracket 24c.

The length of rod 20 is selected to allow mounting of one or more magnifying lenses thereon such as lenses 16a,16b. More particularly, lenses 16a,16b are themselves mounted in an eye-ring 16c,16d which is secured with a conventional barrel and screw 16e,16f and 16h,16g, respectively. Eye-rings 16c,16d are fixed to first ends 18',18b' of arms 18a, 8b, respectively, and may include a bend b1,b2 formed adjacent ends 18a',18b' for proper placement of the lenses in front of the eyewear lenses when in use, respectively. The opposite ends 18a",18b" include a hole through which rod 20 extends such that arms 18a,18b may pivot thereabout. A spring 19 is placed on rod 20 between pivot arm 24b and the first lens arm 18a to maintain a stop member 21 mounted on rod 20 against arm end 18a" at the appropriate distance from clamping mechanism 14. For additional lenses such as lens 16b, a spacer 23 is provided on rod 20 between arm ends 18a" and 18b", with a second stop member 25 provided at the opposite side of arm member 18b". It is noted that spring end 19' may be formed non-symmetrical in cross-section (e.g., square) and inserted and secured within a cooperatively shaped through-hole 23 formed in pivot arm 24b and thereby prevent rotation of spring 19 on arm 20. As such, the tension of spring 19 is appropriately maintained.

To alternately mount and remove the clamping mechanism 14 to and from an eyewear, the user opens the clamping mechanism 14 by pressing finger flanges 24a,26a together with a thumb and forefinger as illustrated in FIG. 3a. This action opens respective jaws $J_1$ and $J_2$ of gripping members 24,26, thereby providing the necessary clearance for attaching or removing the clamping mechanism to or from the eyewear. The terminal ends of jaws 24b,26b may curve toward each other as shown to define a first eyewear engaging space $S_1$. In a preferred embodiment, the jaws of one of the gripping members is bifurcated, such as at Ja,Jb (seen best in FIG. 4), with the other jaw $J_1$ being unitary and fitting between jaw segments Ja,Jb in an interleaved fashion, when in the closed, clamped position of the clamping member 14. In FIG. 3b, an eyewear temple of relatively large cross-section $T_1$ is seen to fit within space $S_1$ and thereby firmly clamping clamping mechanism 14 to temple $T_1$.

It will be appreciated that the jaws may be spread open to a maximum spread position, which is determined by both the size and shape of the gripping members 24,26. The maximum spread position of the jaws in turn dictate the maximum size of the eyewear portion to which the clamping mechanism may be attached. In the case of a non-shield type eyewear such as seen in FIGS. 1 and 3a, the eyewear portion to which the clamping mechanism attaches will typically be the temple T at a location adjacent the hinge connection to the front frame 15. This maximum spread position may thus be chosen when designing the clamping mechanism according to the types and sizes of eyewear the loupe is intended to be used with.

It will further be appreciated that while there is a maximum spread position which dictates the maximum size of the eyewear portion to which the clamping mechanism may be attached, there is also a minimum spread position when the loupe is unattached to an eyewear, as seen in FIG. 2. Should an eyewear have an attachment portion which is sized smaller than the minimum spread position, there is risk that the clamping mechanism will not be tightly clamped thereto which could lead to unintended slipping of the clamping mechanism on the eyewear. Should this occur, the lenses 16a,16b would fall out of the field of view and thus not work as intended. The novel clamping mechanism of the present invention thus includes more than one eyewear-engaging space, and preferably three differently sized eyewear-engaging spaces, wherein eyewear portions of consecutively smaller dimensions may be positioned in a tightly clamped arrangement with the eyewear loupe.

More particularly, a second eyewear-engaging space may be formed inwardly adjacent first eyewear-engaging space $S_1$ by a pair of prongs 34,36 which extend from the facing surfaces of jaws $J_1$ and $J_2$, respectively, and align to define a second eyewear-engaging space $S_2$ wherein a temple of a relatively medium cross-section $T_2$ may fit and be firmly clamped as seen in FIG. 3b. The maximum spread position of space $S_2$ is necessarily smaller than the maximum spread position of space $S_1$.

A third eyewear engaging space $S_3$ is defined by hooked flanges 38,40 extending from pivot bracket 24b,24c of gripping member 24, respectively, and a single hooked flange 42 extending toward hooked flanges 38,40 from the outwardly facing surface of the opposite gripping member 26. An eyewear temple of relatively small cross-section $T_3$ may fit within space $S_3$ and be firmly clamped thereby as seen in FIG. 3b.

It will thus be appreciated that clamping mechanism 14 may be removably attached to temples having small, medium and large cross-sections.

Figure 5A:
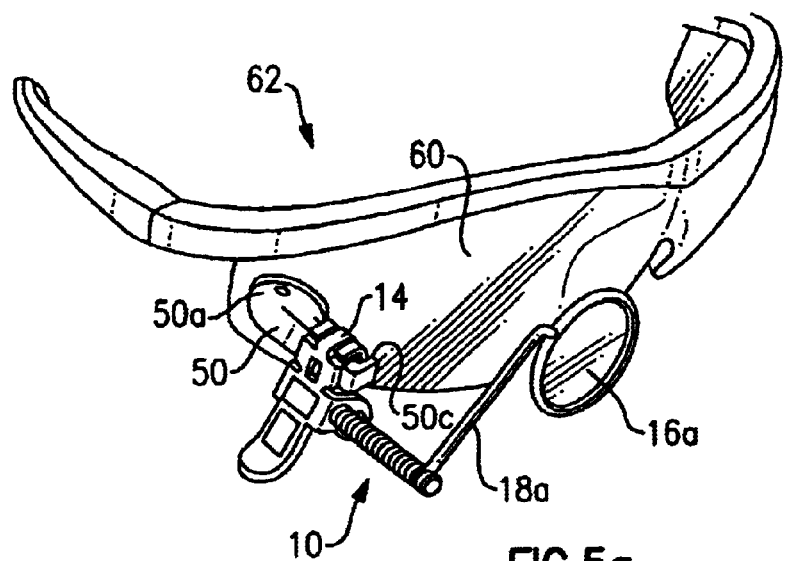
FIG. 5a is a perspective view of a curved wrap-around shield eyewear showing the shield adapter to which the clamping mechanism of the loupe attaches.
Figure 5B:
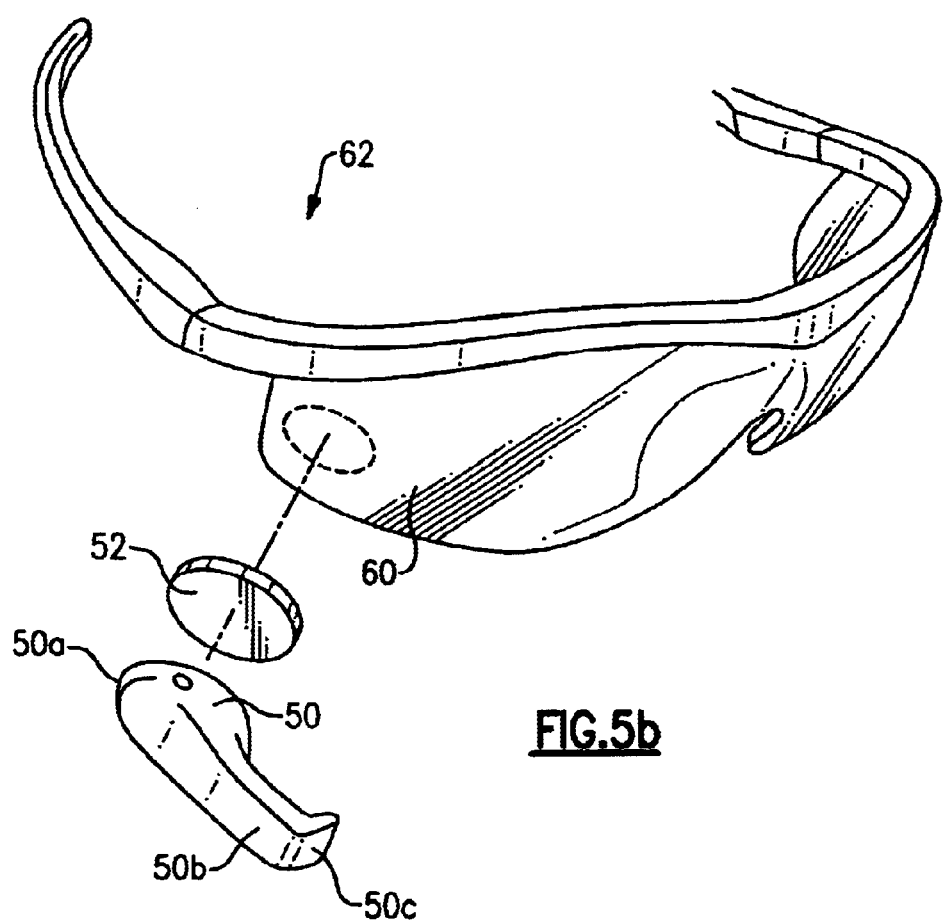
FIG. 5b is the view of FIG. 5a showing one manner by which the shield adapter may be mounted to the eyewear shield.
Figure 6A:
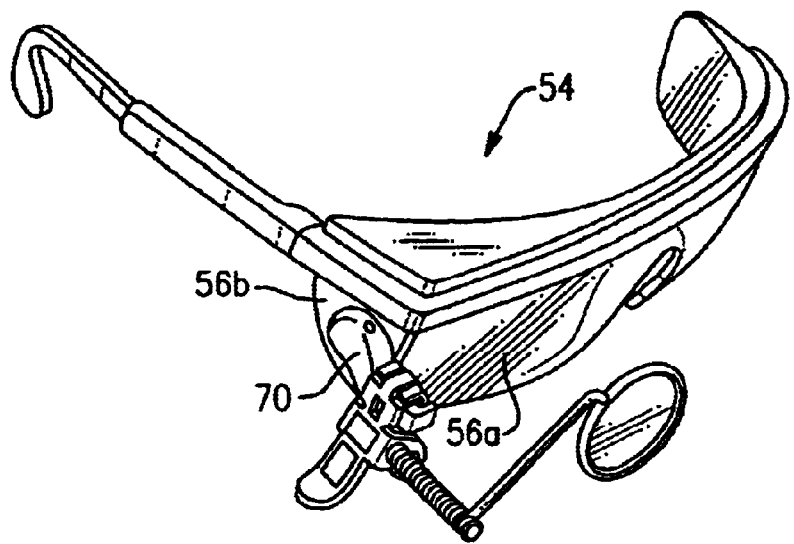
FIG. 6a is a perspective view of an angled wrap-around shield eyewear showing a second embodiment of the shield adapter to which the clamping mechanism of the loupe attaches.
Figure 6B:
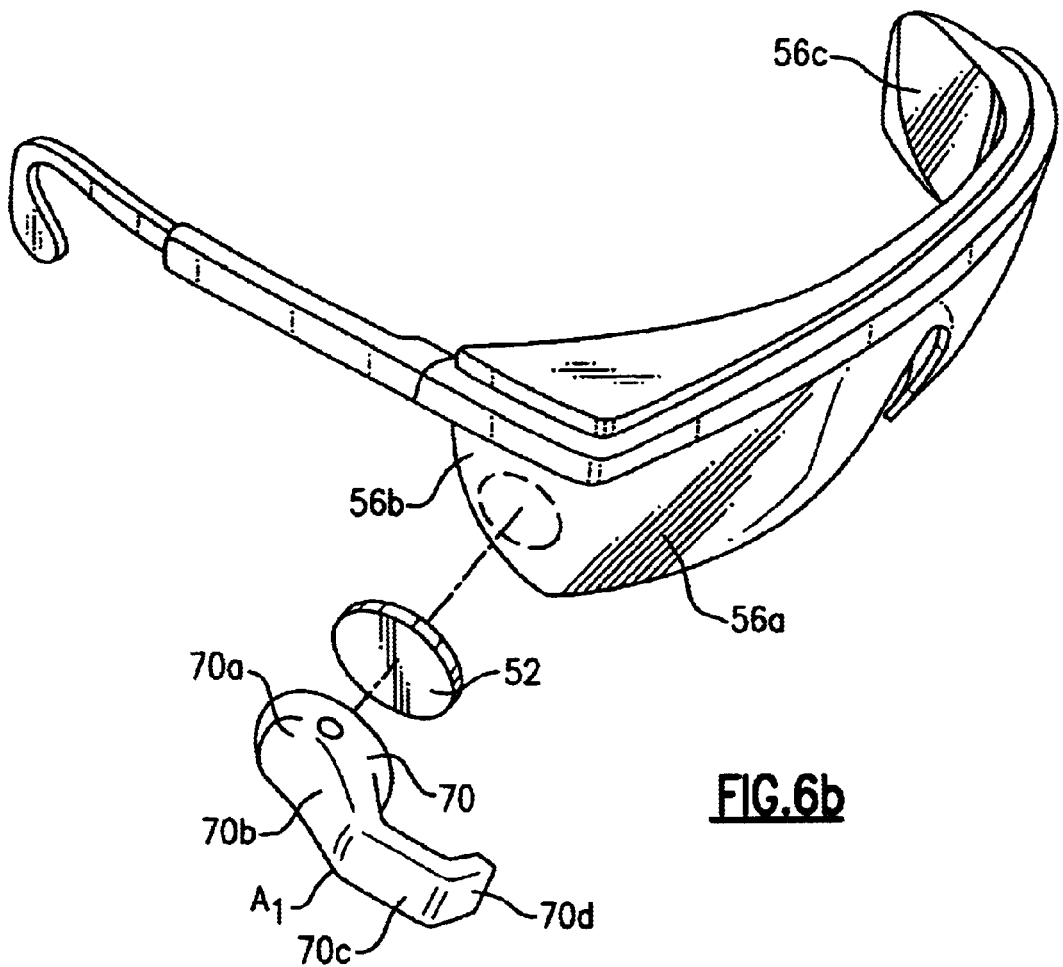
FIG. 6b is the view of FIG. 6a showing one manner by which the shield adapter may be mounted to the eyewear shield.

Referring to FIGS. 5a, 5b and 6a, 6b, a further embodiment of eyewear loupe 10 is shown which includes an adapter which allows the loupe to be attached to the shield of shield-type eyewear such as found in many of today's safety glasses, for example. Particularly, this type of eyewear may have the temple region set so far back that the loupe cannot attach to the temple and still be able to position the lens in the wearer's field of view. In this case, a shield adapter 50 is provided which may be attached to the shield portion 60 of a shield-type eyewear such as the curved shield-type eyewear 62 seen in FIGS. 5a, 5b. Shield adapter 50 is seen to include a base portion 50a and an arm portion 50b to which clamping mechanism 14 removably attaches as seen in FIG. 5a. In the preferred embodiment, arm 50b includes an angled, terminal end 50c which acts as a stop for the clamping mechanism 14 such that it will not unintentionally slip off the arm portion 50b. The adapter 50 may be attached to the eyewear shield 60 by any means, although it is preferred that adapter 50 be attached to the shield 60 via an adhesive pad 52. Other possible attachment means may include a liquid adhesive, a pair of magnetically coupled members placed on the shield and adapter, respectively, or a boss provided on the base portion 50a which may be snap-fit through a hole formed in the shield, for example. It is preferred that the cross-section of the adapter arm 50b be sized to permit fitting thereof within space $S_1$ of the clamping mechanism, although this may vary according to the desires of the user. The arm 50b may also be angled to fit a variety of eyewear sizes and types, with the only requirement being that it acts to allow the magnifying lens or lenses thereof to be moved into and out of the wearer's field of vision. For example, as seen in FIGS. 6a and 6b, an angled shield-type eyewear 54 includes a front shield 56a as well as side shield portions 56b,56c. In this style of eyewear, placement of adapter 70 is on the side shield 56b or 56c rather than the front shield 56a. Again, adapter 70 may be affixed thereto via an adhesive pad 52 or other means as described above. The adapter arm 70b is angled at point $A_1$, toward the user's field of vision. As such, clamping mechanism 14 may be removably attached to the middle extent 70c which is located between portion 70b and terminal end 70d. The degree of angle $A_1$ may vary depending on the size and configuration of the eyewear. The main consideration in selecting the appropriate angle is that the magnifying lens or lenses of the loupe be properly positioned in the wearer's field of vision.

The present invention has been described with regard to preferred embodiments thereof, it will be appreciated to those skilled in the art that various modifications may be made thereto without departing form the full scope of the invention as defined in the claims which follow.

What is claimed is:

1. An eyewear loupe for removable attachment to an eyewear, said eyewear loupe comprising:
   a) one or more magnifying lenses; and
   b) a clamping mechanism to which said one or more lenses are connected, said clamping mechanism comprising:
      i) first and second gripping members defining first and second jaws having facing surfaces and at a first end of said first and second gripping members, said first and second jaws being spring biased in the closed, clamped position, said first and second members further defining first and second finger engaging portions located at a second, opposite ends of said first and second gripping members, respectively, and which may be pressed together against said bias and thereby spread said first and second jaws apart, said first and second jaws each having a terminal end which together define a first space $S_1$ having a maximum spread position and in which a portion of an eyewear may be removably fit, thereby removably attaching said eyewear loupe to said eyewear; and
      ii) first and second prongs attached to the facing surfaces of said first and second jaws inwardly of said terminal ends thereof, respectively, said first and second prongs defining a second space $S_2$ adjacent said first space $S_1$ and in which a portion of an eyewear may be removably fit, thereby removably attaching said eyewear loupe to said eyewear, said second space $S_2$ having a maximum spread position which is smaller than said maximum spread position of said first space $S_1$ such that said second space $S_2$ can firmly clamp to a relatively medium sized eyewear portion.

2. The eyewear loupe of claim 1, wherein said clamping mechanism further comprises first and second hooked flanges extending from said first gripping member, and a third hooked flange extending from said second gripping member toward said first and second hooked flanges, said first, second and third hooked flanges together defining a third space $S_3$ in which a portion of an eyewear may removably fit and thereby removably attach said eyewear loupe to said eyewear, and wherein the maximum spread area of said third space $S_3$ is smaller than said maximum spread areas of either of said first and second spaces $S_1$ and $S_2$ such that said third $S_3$ can firmly clamp to a relatively small sized eyewear portion.

3. The eyewear loupe of claim 1, and further comprising:
   a) an adapter having a base portion and an arm portion extending from said base portion; and
   b) means for attaching said base portion to an eyewear with said arm portion extending therefrom and to which said clamping mechanism may be removably clamped.

4. The eyewear loupe of claim 3 wherein said means for attaching said base portion comprises an adhesive applied between said base portion and said eyewear.

5. An assembly comprising:
   a) an eyewear loupe having one or more magnifying lenses connected thereto for removably attaching to an eyewear; and
   b) an adapter for attaching to the shield of an eyewear, said adapter having an arm to which said loupe may be removably attached.

6. An adapter for attaching a separate magnifying loupe having a clamp to an eyewear, said adapter having a base portion for attaching to said eyewear and an arm portion extending from said base portion and to which said clamp of said magnifying loupe may be coupled.

7. The adapter of claim 6, and further comprising an adhesive pad which affixes said base position to said eyewear.

8. An eyewear assembly comprising:
   a) a pair of shield-type safety glasses;
   b) an eyewear magnifying loupe having one or more magnifying lenses carried thereon;
   c) an adapter having a base portion and an arm portion, said eyewear loupe removably attachable to said arm potion; and
   d) means for securing said base portion of said adapter to the shield of said eyewear.

9. The eyewear assembly of claim 8 wherein said arm portion is angled.

* * * * *